E. P. NORTON.
VEGETABLE SLICER.
APPLICATION FILED JUNE 9, 1916.
1,213,681.
Patented Jan. 23, 1917.
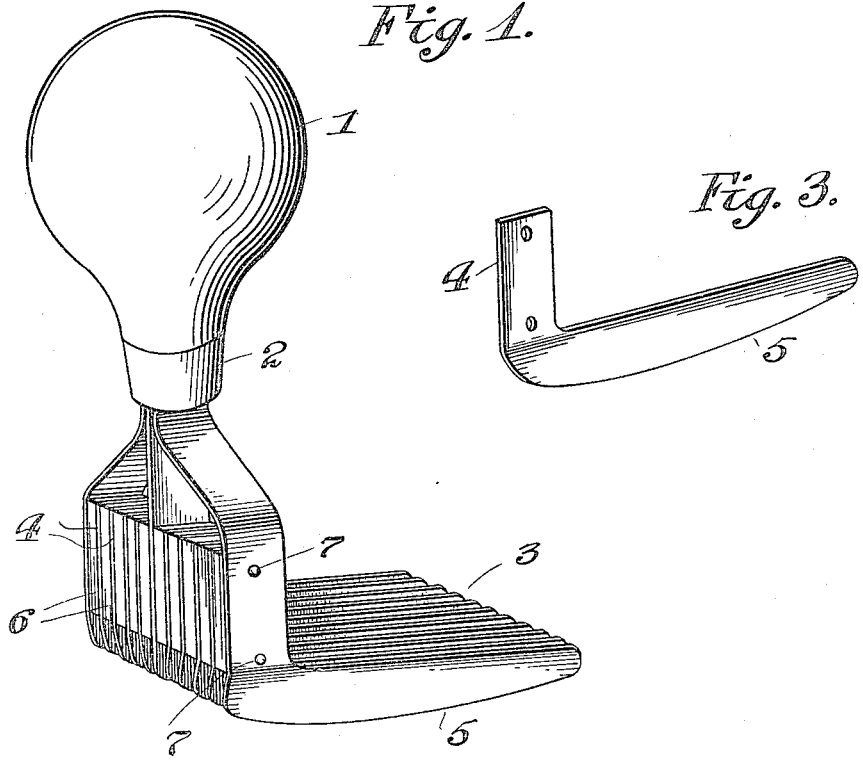
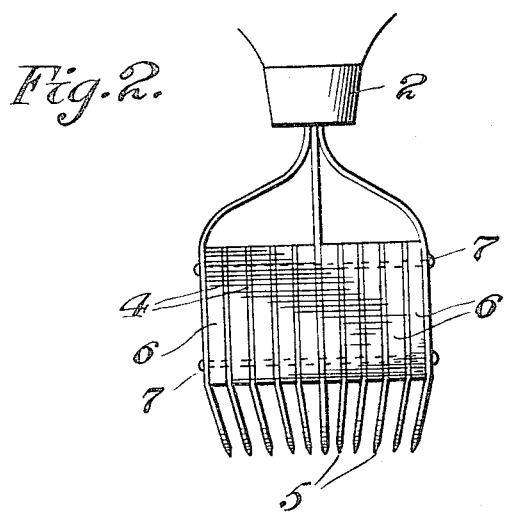
Witnesses
U. H. Shallenberger
J. C. Wilcox
Inventor
E. P. Norton.
By Victor J. Evans
Attorney

UNITED STATES PATENT OFFICE.

EDWARD P. NORTON, OF COTTONWOOD FALLS, KANSAS.

VEGETABLE-SLICER.

1,213,681.  Specification of Letters Patent. Patented Jan. 23, 1917.

Application filed June 9, 1916. Serial No. 102,731.

*To all whom it may concern:*

Be it known that I, Edward P. Norton, a citizen of the United States, residing at Cottonwood Falls, in the county of Chase and State of Kansas, have invented new and useful Improvements in Vegetable-Slicers, of which the following is a specification.

This invention relates to vegetable slicers and it consists in the novel features hereinafter described and claimed.

An object of the invention is to provide a slicer of simple and durable structural arrangement adapted to be used for preparing vegetables by slicing them into bits or strips.

With the above object in view the structure includes a series of blades held by blocks in spaced relation with respect to each other and connected with a suitable handle. The blades have angularly disposed end portions which are referred to hereinafter as the cutting ends and shank ends respectively. The shank end portions are held in parallel relation to each other while the cutting end portions converge downwardly toward each other thereby providing sufficient space or clearance to permit the strips or bits of the vegetables to freely pass up through the spaces between the cutting end portions of the blades during the operation of reducing the vegetables to strips or bits.

In the accompanying drawing:—Figure 1 is a perspective view of the slicer. Fig. 2 is an end view of the same. Fig. 3 is a detail view of a blade.

The vegetable slicer comprises a handle 1 which is preferably formed from wood and having a ferrule 2 applied to one end thereof. The cutting elements are in the form of blades indicated in general at 3 and each blade is provided with a shank end portion 4 and a cutting end portion 5. The shank end portions 4 are disposed at an angle with relation to the cutting end portion 5. The shank end portions of the blades are held in parallel relation by means of spacing blocks 6 located between the shank end portions and secured in position by means of bolts or rivets 7 which pass transversely through the said blocks and the shank end portions of the said baldes. The shanks of the intermediate and terminal blades of the set of blades 3 are extended up and joined with the handle 1 within the ferrule 2.

As illustrated in Fig. 2 of the drawing all portions of the intermediate blade 3 lie in the same plane, while the lower portions of the other blade converge downwardly toward each other along the cutting parts 5 of the blade. Therefore it will be seen that the lower edges of the cutting ends 5 are in closer relation than the upper edges of the adjacent cutting ends hence sufficient space or clearance is provided to permit the particles of vegetables to pass in an upward direction during the cutting operation.

In operation the vegetable which is to be reduced to slices or bits is placed upon a block or other suitable support and the cutting portion 5 of the blade 3 is moved in a downward direction through the vegetable thereby reducing it to strips or slices. This operation may be repeated as many times as desired and if preferred the device may be conveniently used for reducing the vegetable to cubes or other similar particles of relatively small dimensions in all directions.

From the foregoing description taken in conjunction with the accompanying drawing it will be seen that a vegetable slicer of simple and durable structure is provided and that the same may be easily and conveniently used for effectually reducing a vegetable to small strips or particles.

Having described the invention what is claimed is:—

1. A vegetable slicer comprising blades having angularly disposed shank portions and cutting ends, blocks interposed between the shank portions of the blades and holding the same substantially in parallel relation, the cutting end portions of the blades being converged downwardly toward each other.

2. A vegetable slicer comprising a series of blades having shank ends and cutting ends which are disposed at angles with relation to each other, blocks interposed between the shank ends of the blades and holding the same substantially in parallel relation, the cutting ends of the blades being converged downwardly toward each other, the shanks of some of the blades being extended above the blocks and a handle mounted upon the extended portions of the said shanks.

3. A vegetable slicer comprising a series of blades having angularly disposed shanks and cutting ends, blocks interposed between the shank ends of the blades and holding the same in substantially parallel relation, the cutting ends of the blades being converged downwardly toward each other, the shank portion of the intermediate blade being extended in an upward direction and a handle mounted upon the said shank portion and the shank portions of the terminal blades being extended above the upper ends of the blocks and connected with the said handle.

In testimony whereof I affix my signature in presence of two witnesses.

EDWARD P. NORTON.

Witnesses:
L. M. SWOPE,
R. B. BUELL.

Copies of this patent may be obtained for five cents each, by addressing the "Commissioner of Patents, Washington, D. C."